3,801,660
POLYMERIZABLE VINYL CHLORIDE FROM 1,2-DICHLORETHANE PYROLYSIS PRODUCTS
Guillaume Coppens, Brussels, Belgium, assignor to Solvay & Cie, Brussels, Belgium
Continuation of abandoned application Ser. No. 760,847, Sept. 19, 1968. This application Apr. 28, 1971, Ser. No. 138,364
Int. Cl. C07c 21/02
U.S. Cl. 260—656 R
3 Claims

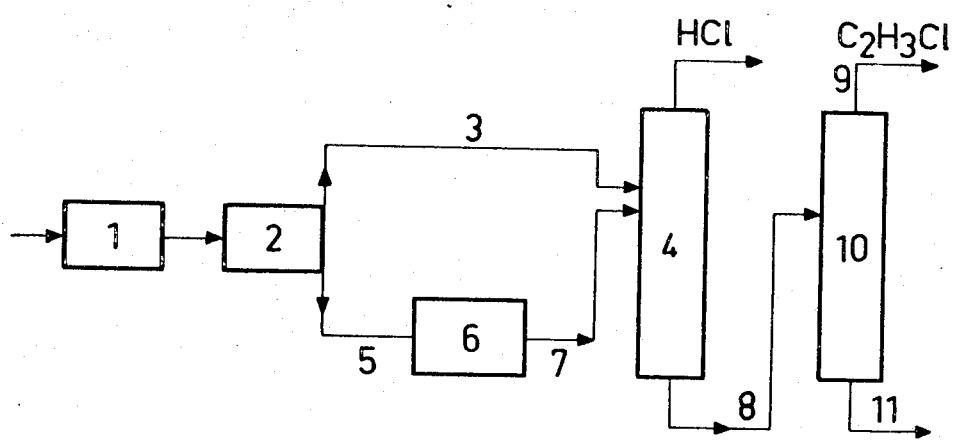
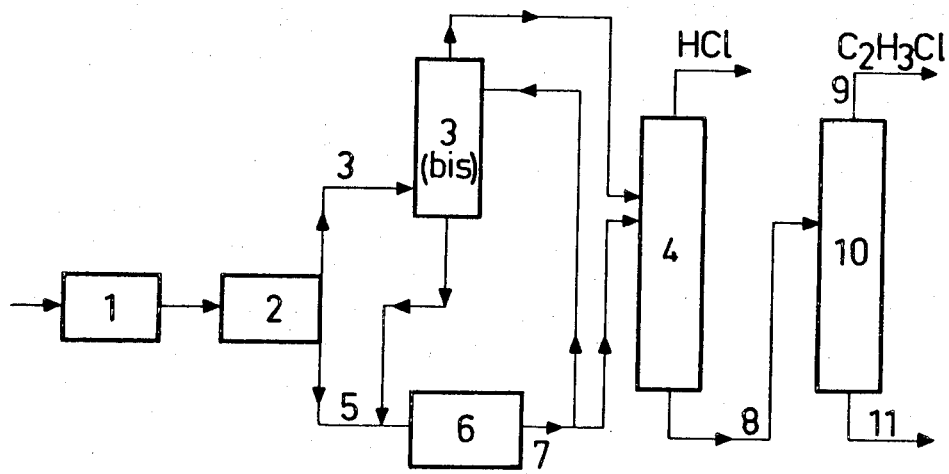

ABSTRACT OF THE DISCLOSURE

Pyrolysis products of 1,2-dichlorethane are cooled and a low-boiling gaseous fraction thereof is separated from a liquid fraction. Butadiene in the liquid fraction is removed therefrom prior to recombining said fraction with the gaseous fraction in a distillation column from which hydrogen chloride gas is withdrawn from the head and the tails are conducted to a second such column. Vinyl chloride withdrawn from the head of the second column is directly polymerizable.

CROSS-REFERENCE TO RELATED APPLICATION

This application is a continuation of co-pending application Ser. No. 760,847 filed Sept. 19, 1968.

BACKGROUND

Pyrolysis products of 1,2-dichlorethane often contain small quantities, in the order of 10 to 40 parts by weight per million parts by weight of vinyl chloride, of butadiene. Such concentrations of butadiene inhibit the polymerization of vinyl chloride containing same; it is necessary to lower these concentrations to at most 5 parts per million in order that polymerization, particularly emulsion polymerization, may occur normally.

Although the concentration of butadiene formed may be even smaller when the initial purity of 1,2-dichlorethane is greater, it is still necessary to remove butadiene from vinyl chloride obtained by the pyrolysis of 1,2-dichlorethane according to known processes.

Belgian Pat. No. 564,178 suggests the purification of vinyl chloride obtained by the pyrolysis of 1,2-dichlorethane by contacting the monomer in admixture with hydrogen chloride, in the vapor phase, with a hydrochlorination catalyst, such as $HgCl_2$ or $FeCl_3$. Said process, however, requires (a) the inclusion of a supplemental catalytic treatment installation, which can substantially increase manufacturing costs, and (b) the separation of at least part of the non-converted dichlorethane from the pyrolysis products.

U.S. Pat. No. 3,142,109, describes removing butadiene from the vinyl chloride by contacting the liquid vinyl chloride with a quantity, between 0.5 to 5% by weight of the vinyl chloride, of anhydrous hydrogen chloride for a period of between 2 minutes and 5 hours. This process, like the preceding one, is only applicable to vinyl chloride which has already been separated from the other pyrolysis products. It requires the utilization of accurately defined quantities of hydrogen chloride to avoid a subsequent purification to eliminate any excess.

SUMMARY

Starting from products resulting from the pyrolysis of 1,2-dichlorethane, the present invention is directed to a process for obtaining vinyl chloride capable of being directly subjected to polymerization. The invention is characterized by condensing the raw pyrolysis product, under a pressure greater than atmospheric, to obtain a liquid phase which is allowed to stand for 2 hours at a temperature of at least 0° C., and ordinarily in the range from 0° to 100° C., before separating the components thereof. After the indicated period of time the liquid phase is referred to as "cured."

After such a treatment the liquid phase no longer contains detectable quantities of butadiene. As a practical matter a solid hydrochlorination catalyst, such as a metal chloride, could readily be incorporated in said liquid phase, but this is unnecessary.

The cured liquid is distilled under controlled conditions to separate sequentially therefrom hydrogen chloride gas and polymerizable vinyl chloride.

The object of the invention is to provide a simple and effective means to prepare polymerizable vinyl chloride from 1,2-dichlorethane pyrolysis products. A further object is to avoid inconveniences of known treatments carried out on finished vinyl chloride. Another object is to avoid supplemental difficult or delicate operations. Still further objects are apparent from the description which follows.

DRAWINGS

The two figures are directed to flow diagrams illustrating embodiments of the invention. FIG. I exemplifies the basic process, and FIG. II shows a variant thereof.

DETAILS

The preliminary condensation step is generally effected at a superatmosphere pressure by cooling the gaseous pyrolysis products. The condensation results in a gaseous phase which contains butadiene and which is in equilibrium with a liquid phase. During said preliminary condensation the superatmospheric pressure is maintained between 1 and 30 kilograms per square centimeter (kg./cm.$^2$), preferably from 4 to 20 kg./cm.$^2$. The cooling temperature is from 0° to 300° C., preferably from 0° to 200° C.

As already noted, the thus-obtained liquid phase is maintained for at least two hours at a temperature, preferably, within the range of from 0° to 100° C. After this period said liquid phase can advantageously be used as a washing liquid for the gaseous phase to absorb residual butadiene therefrom. The liquid phase so employed for washing the gaseous phase is again allowed to stand for at least two hours to cure same. By repeating this operation in one or several columns (according to butadiene concentration in the raw pyrolysis product), total removal of butadiene is achieved.

By allowing condensate to rest at least two hours at a temperature between 0 and 100° C., there is eventually no more butadiene in this condensate, herein referred to as "cured" condensate.

The components of the cured liquid phase, primarily hydrogen chloride, vinyl chloride and non-converted 1,2-dichlorethane, are then separated by any of the procedures known in the art and established for this purpose. One such procedure comprises an expansion followed by distilling the obtained gases at relatively low temperatures, e.g. at from −80° to 80° C. It is preferred, however, to separate the hydrogen chloride first, then the vinyl chloride, in two successive columns functioning under a pressure, e.g. from 1 to 18 kg./cm.$^2$, close to that of the cured liquid phase. This latter procedure makes it possible to use distillation temperatures, e.g. from −40° to 80° C., which need not be maintained too low. However, the organic phase must not remain more than 40 minutes in the heater of the vinyl chloride distillation column, and the heater temperature should not exceed 160° C.

When either the time or the temperature limit is exceeded, the final vinyl chloride can lose its polymerization capability.

To facilitate understanding the purification of the liquid phase, reference is made to FIGS. I and II for a description of two devices provided for this purpose.

According to FIG. I, a pyrolysis oven 1 is maintained at a temperature of 500° C. and under a pressure of the order of 11 kg./cm.². The oven, which may be furnished with a packing of inert material having a silica base, is supplied with pure 1,2-dichlorethane. The product from this oven, which comprises, e.g., 10 to 60% by weight of vinyl chloride, 5 to 50% by weight of hydrogen chloride, 20 to 80% by weight of non-converted 1,2-dichlorethane and 0 to 0.2% by weight of butadiene, passes to 2 where it is quenched to bring its temperature to around 150° C.

The gaseous phase which is withdrawn via conduit 3 contains from 5 to 45% by volume of vinyl chloride, from 55 to 95% by volume of hydrogen chloride and from 0 to 0.2% by volume of butadiene and is fed into column 4. There is no change in butadiene content in conduit 3 and butadiene goes unchanged into the final vinyl chloride. The liquid phase flows via 5 at the bottom of 2, is cooled to 40° C. under a pressure of the order of 10 atmospheres and passes into the storage or curing device 6, where it remains for at least two hours before delivery to column 4 via line 7. The cured liquid almost entirely comprises 1,2-dichlorethane, vinyl chloride and a small amount, e.g. from 1 to 15% by weight, of hydrogen chloride.

The curing device may be a suitable vessel provided with inlet and outlet such as to avoid back-mixing of the liquid; this vessel may be made for example of steel, alloys cladded steel or enamelled steel.

The butadiene present in the product entering 2 is divided equally between lines 3 and 5. Surprisingly, however, the liquid phase in conduit 7, which was maintained for some time in 6, is virtually free from butadiene; it contains 1,2-dichlorethane 40–80%; hydrogen chloride 1–20%; vinyl chloride 10–50%.

Hydrogen chloride is removed from the top of 4 at around −30° C. under a pressure of 10 kg./cm.² while a liquid phase, removed via line 8, from a heater maintained at 90° C., is directed to column 10. Vinyl chloride is separated at 40° C. under a pressure of 5 kg./cm.², via the head of 10, while the foot, maintained at 150° C., furnishes through line 11 virtually only 1,2-dichlorethane and chlorinated C₄ products.

The product passed from 4 through line 8 does not remain more than 30 minutes in the heater of column 10. Vinyl chloride finally obtained in 10 can be polymerized without difficulty.

The process and apparatus make it possible to obtain polymerizable vinyl chloride from pyrolysis products containing at most ten parts by weight of butadiene per million parts by weight of vinyl chloride.

The columns 3′, 4 and 10 are well known for one skilled in the art, they may be provided with any kind of trays or packing. Columns and trays for 3′, 4 and 10 may be made of a suitable material, such as steel, stainless steel and also Ni-alloys, e.g. Inconel, Hastelloy and Monel. Particularly, bottoms and reboilers of the columns 4 and 10 may be made of Monel or Inconel.

When the initial concentration at the output of 1,2-dichlorethane pyrolysis is 10 to 20 parts or more by weight of butadiene per million parts by weight of vinyl chloride, the flow sheet of FIG. II can be advantageously applied. The process depicted thereby is identical with that of FIG. I except that the products passing via 3 are washed in column 3′ by countercurrent contact with liquid phase derived from line 7, the foot of washing column 3′ being connected to reservoir 6, where the material emerging from the foot of the column is combined with the liquid phase flowing from the bottom of 2 and again maintained for at least two hours before being conveyed via 7. The proportion of cured liquid phase in line 7 being recirculated through washing column 3′ is regulated on the basis of the concentration of butadiene in the effluent line 3 from 2.

The flow diagram of FIG. II permits total elimination of butadiene from the material leaving the foot of column 4.

The process and apparatus details herein presented are merely exemplary, and not limitative. The gaseous phase leaving the head of washing tower 3′, e.g., could be subjected again to a counter-current washing by another liquid fraction derived from conduit 7, and so on. It is important, however, that the concentration of butadiene in vinyl chloride present in the product from column 4 be within tolerable limits, i.e. at most 5 parts by weight of butadiene per million parts by weight of vinyl chloride, for the polymerization of the vinyl chloride.

The vinyl chloride obtained at the head of column 10 is suitable for direct polymerization when the heater in said cloumn is maintained at a temperature of at most 60° C. and when the influent thereto from conduit 8 is permitted to remain therein for no longer than 40 minutes.

Example

According to FIG. II, the gaseous product issued from the pyrolysis reactor 1 has the following composition

| | Percent by wt. |
|---|---|
| 1,2-dichlorethane | 50 |
| Vinyl chloride | 31 |
| Hydrogen chloride | 19 |
| Butadiene | 0.015 |

This gaseous product leaves the reactor 1 under a pressure of 11 atm., a temperature of 530° C. and with a flow-rate of 1 metric ton/h. By cooling in 2, two phases are obtained at a temperature of 40° C.

A liquid phase containing:

| | Percent by wt. |
|---|---|
| 1,2-dichlorethane | 60 |
| Vinyl chloride | 30 |
| Hydrogen chloride | 10 |
| Butadiene | 0.014 | which is sent to curing device 6.

A vapor phase containing:

| | Percent by wt. |
|---|---|
| 1,2-dichlorethane | <0.5 |
| Vinyl chloride | 35 |
| Hydrogen chloride | 65 |
| Butadiene | 0.017 |

The gaseous phase after washing in column 3′ with cured condensate contains no more butadiene; this gaseous stream is then introduced in column 4.

The liquid phase issued from 2, is allowed to stand two hours in device 6 under a pressure of 11 atom. and a temperature of 40° C. and then contains no more butadiene. A part of stream 7 is used as washing liquid for 3′ and this liquid recovered at the bottom of 3′ is sent back to 6; the other part of stream 7 is sent to column 4. This column is maintained under 10 atm., the temperatures are: −30° C. at the top and 100° C. at the bottom; the liquid product from 4 is removed by 8; in the boiler of column 10, the liquid does not stand more than 40 minutes and the temperature of the boiler is about 150° C. By 9, vinyl chloride is obtained at a rate of 310 kg./h.; it is free of butadiene.

I claim:

1. A process which comprises (a) condensing raw pyrolyzed 1,2-dichlorethane at superatmospheric pressure to obtain a gaseous phase, containing hydrogen chloride, vinyl chloride and butadiene, in equilibrium with condensate, containing hydrogen chloride, vinyl chloride, 1,2-dichlorethane and butadiene, (b) maintaining the condensate for at least two hours at a temperature of from 0° to 100° C., whereby cured condensate virtually free from butadiene is obtained, (c) washing the gaseous phase with part of the cured condensate, whereby said cured condensate absorbs butadiene present in said gaseous phase to yield a washing liquid containing butadiene, 1,2-dichlorethane, vinyl chloride and hydrogen chloride, and (d) subsequently maintaining the washing liquid for at least two hours at a temperature of from 0° to 100° C. to obtain a cured liquid phase.

2. A process according to claim 1 wherein step (d) comprises maintaining the washing liquid for at least two hours at a temperature of from 0° to 100° C. together with raw pyrolyzed 1,2-dichlorethane condensate to obtain a cured liquid phase.

3. A process according to claim 1 which comprises sequentially separating hydrogen chloride and vinyl chloride from cured condensate and from the cured liquid phase.

References Cited

UNITED STATES PATENTS

| | | | |
|---|---|---|---|
| 2,724,006 | 1/1955 | Krekeler | 260—656 |
| 3,055,955 | 9/1962 | Hodges | 260—656 |
| 3,142,709 | 7/1964 | Gause et al. | 260—656 |
| 3,468,967 | 9/1969 | Wall et al. | 260—656 |
| 3,476,955 | 11/1969 | Krekeler et al. | 260—656 |
| 3,484,493 | 12/1969 | Krekeler et al. | 260—656 |

OTHER REFERENCES

| | | | |
|---|---|---|---|
| 623,964 | 4/1963 | Belgium | 260—656 |

LEON ZITVER, Primary Examiner

A. SIEGEL, Assistant Examiner

UNITED STATES PATENT OFFICE
CERTIFICATE OF CORRECTION

Patent No. 3,801,660                        Dated April 2nd, 1974

Inventor(s) Guillaume Coppens

It is certified that error appears in the above-identified patent and that said Letters Patent are hereby corrected as shown below:

In the heading of the patent, after line 8, insert
--Foreign Application Priority Data
  Sept. 20, 1967  Germany S 111 889--.
Column 1, line 53, change "U.S. Pat. No. 3,142,109" to
--U.S. Pat. No. 3,142,709--. Column 4, line 13, change "clou
to --column--; line 49, change "atom." to --atm.--.

Signed and sealed this 8th day of October 1974.

(SEAL)
Attest:

McCOY M. GIBSON JR.                    C. MARSHALL DANN
Attesting Officer                     Commissioner of Patents